(No Model.)

C. J. PARKER.
COOKING VESSEL.

No. 503,353. Patented Aug. 15, 1893.

Witnesses:—
Arthur O. Balendreier.
Alvan Macauley

Inventor:—
Charles J. Parker
By Chas B. Mann
  atty

UNITED STATES PATENT OFFICE.

CHARLES J. PARKER, OF HAVRE DE GRACE, MARYLAND.

COOKING-VESSEL.

SPECIFICATION forming part of Letters Patent No. 503,353, dated August 15, 1893.

Application filed March 27, 1893. Serial No. 467,716. (No model.)

*To all whom it may concern:*

Be it known that I, CHARLES J. PARKER, a citizen of the United States, residing at Havre de Grace, in the county of Harford and State of Maryland, have invented certain new and useful Improvements in Cooking-Vessels, of which the following is a specification.

This invention relates to an improvement in cooking utensils and has for its object to provide an inner cooking vessel and an outer casing therefor, said parts being so constructed with relation to each other, that the heated air will be uniformly distributed within the casing to all parts of the inclosed cooking vessel.

Figure 1:
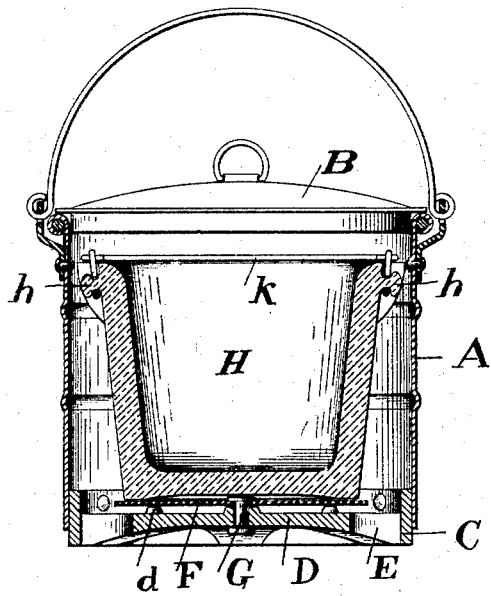
Figure 2:
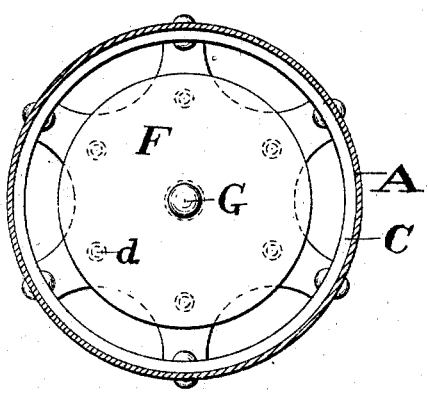
Figure 3:
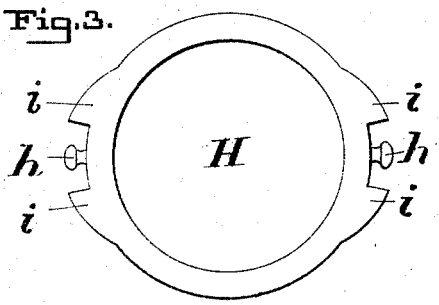
Figure 4:
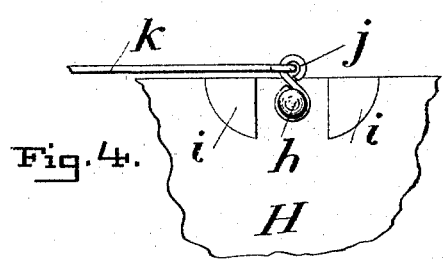

In the accompanying drawings, Figure 1, is a vertical section through the cooking-utensil. Fig. 2, is a section on line 2—2 of Fig. 1. Fig. 3, is a top-plan view of the cooking-vessel. Fig. 4, is a side elevation of the handle of the cooking vessel and the method of attaching the same.

Referring to the drawings the letter, A, indicates the casing which may be of any desired form, but is preferably cylindrical as shown. It is open at both ends but its upper end is provided with a removable cover, B, by means of which the escape of the heated air, and vapors may be prevented. A ring C, of a size to fit closely within the casing, A, to which it is secured at its bottom edge and preferably so that said ring shall extend below the casing. The bridge or support, D, is connected to the ring above the level of the bottom thereof, for a reason hereinafter described. On the upper surface of the bridge or support are a number of knobs, $d$, designed to keep the false bottom, F, from actual contact with the bridge or support to which it is secured in the present instance by the rivet, G.

The cooking vessel, H, made of porcelain or earthen-ware is placed upon the false bottom, F. By this means the metallic conduction of heat direct to the cooking vessel is avoided. The heat radiating from the stove circulates around the cooking vessel and under the false-bottom subjecting the cooking-vessel to an equal temperature at all points, thereby avoiding any liability of its cracking or breaking on account of the unequal expansion or contraction. The food too will be more uniformly cooked. It is desirable that the bail, $k$, shall rest on the top edge of the porcelain vessel and not project beyond the circumference thereof, thus leaving clear the annular space between the cooking vessel and the casing, A. It is also desirable to protect the knobs, $h$, of the bail from injury,—to these ends the knobs are each guarded by a projection, $i$, located one on each side as shown. These guards project from the vessel a distance equal to or greater than the length of the knob. By this means there is much less liability of knocking off the knob. The lower loop of each of the 8-shaped links, $j$, embraces one of the knobs and the upper loops extend slightly above the top-edge of the cooking vessel and connect with the bail. This construction enables the bail to lie flat along the top edge of the cooking-vessel.

Having thus described my invention, I claim as new and desire to secure by Letters Patent—

1. The combination of the open ended cylindric casing; a ring fitting within and secured to the casing at the bottom thereof; a bridge or support secured to the ring above the bottom of the casing; a false bottom, F, secured above the bridge or support and leaving a clear space between said false bottom and the support; and a cooking vessel resting on the false bottom, substantially as described.

2. In a cooking vessel the combination of the exterior cylindric casing; the porcelain or earthen ware cooking-vessel in said casing leaving an annular space between the two; the ear knobs, $h$, on said vessel; a guard, $i$, at each side of the ear-knob; the bail, $k$, which rests on the top edge of said vessel, and the links, $j$, connecting the ear-knobs and bail, for the purpose described.

In testimony whereof I affix my signature in the presence of two witnesses.

CHARLES J. PARKER.

Witnesses:
A. O. BABENDREIER,
CHAS. B. MANN, Jr.